US007788582B2

(12) United States Patent
Robbin et al.

(10) Patent No.: US 7,788,582 B2
(45) Date of Patent: Aug. 31, 2010

(54) TECHNIQUES AND GRAPHICAL USER INTERFACES FOR IMPROVED MEDIA ITEM SEARCHING

(75) Inventors: Jeffrey L. Robbin, Los Altos, CA (US); Mike Wiese, Cupertino, CA (US); Patrice Gautier, San Francisco, CA (US); Robert Kondrk, San Jose, CA (US); Timothy Benjamin Martin, Sunnyvale, CA (US); Alexandrea Anderson, Clovis, CA (US); Charles Clinton Lloyd, San Jose, CA (US); David Lawrence Neumann, Portland, OR (US)

(73) Assignee: Apple Inc., Cupertino, CA (US)

( * ) Notice: Subject to any disclaimer, the term of this patent is extended or adjusted under 35 U.S.C. 154(b) by 742 days.

(21) Appl. No.: 11/221,385

(22) Filed: Sep. 6, 2005

(65) Prior Publication Data

US 2007/0055654 A1  Mar. 8, 2007

(51) Int. Cl.
*G06F 3/00* (2006.01)
(52) U.S. Cl. .................. 715/716; 715/719; 715/727
(58) Field of Classification Search ............... 715/705, 715/861, 825, 716, 719
See application file for complete search history.

(56) References Cited

U.S. PATENT DOCUMENTS

| 6,469,719 | B1 * | 10/2002 | Kino et al. ............... 715/810 |
| 7,113,941 | B2 * | 9/2006 | Arend et al. ............. 707/3 |
| 7,340,451 | B2 | 3/2008 | Sacco |
| 2004/0268451 | A1 | 12/2004 | Robbin et al. |
| 2005/0071780 | A1 | 3/2005 | Muller et al. |
| 2005/0193094 | A1 | 9/2005 | Robbin et al. |
| 2007/0055654 | A1 | 3/2007 | Robbin et al. |

OTHER PUBLICATIONS

Quigley Ellie, JavaScript by Example, Jun. 19, 2003, Chapter 12 section 12.7.*
Google Desktop Sidebar obtained using wayback machine dated Aug. 26, 2005.*
U.S. Appl. No. 11/040,260, entitled "Methods and Apparatuses for Inputting" filed Jan. 19, 2005.

* cited by examiner

*Primary Examiner*—Boris Pesin

(57) ABSTRACT

Improved techniques and graphical user interfaces that assist users in searching through a group of media items are disclosed. According to one aspect, a search assistant (e.g., search bar) can be graphically presented to a user to assist the user in selecting search criteria. In one embodiment, the search assistant can be automatically presented when a search process is being considered by a user. In another embodiment, the search assistant can be context sensitive so as to adapt to different types of media items.

16 Claims, 14 Drawing Sheets

TECHNIQUES AND GRAPHICAL USER INTERFACES FOR IMPROVED MEDIA ITEM SEARCHING

CROSS-REFERENCE TO RELATED APPLICATIONS

This application is related to: (i) U.S. patent application Ser. No. 10/832,984, filed Apr. 26, 2004, and entitled "GRAPHICAL USER INTERFACE FOR BROWSING, SEARCHING AND PRESENTING MEDIA ITEMS", which is hereby incorporated by reference herein; (ii) U.S. patent application Ser. No. 10/903,496, filed Jul. 30, 2004, and entitled "GRAPHICAL USER INTERFACE FOR BROWSING, SEARCHING AND PRESENTING CLASSICAL WORKS", which is hereby incorporated herein by reference; and (iii) U.S. patent application Ser. No. 11/061,321, filed Feb. 17, 2005, and entitled "GRAPHICAL USER INTERFACE FOR BROWSING, SEARCHING AND PRESENTING MEDIA ITEMS", which is hereby incorporated herein by reference.

BACKGROUND OF THE INVENTION

1. Field of the Invention

The present invention relates to media management and, more particularly, to media management on computing devices.

2. Description of the Related Art

Conventionally, media management application programs operate on personal computers to facilitate storage and playback of media items, such as music. One example of a media management application program is iTunes®, produced by Apple Computer, Inc. A media management application program typically enables its user to browse or search through a collection of media items stored on a personal computer. However, given the popularity of storage and playback of media items from personal computers, it is not uncommon that users store several thousand different media items (e.g., songs) on their personal computer. Still further, the different media items stored on personal computers can be of different media types, including music, video, photos, audiobooks, etc. Hence, there is a need to facilitate searching through such large collections of media items, particularly multiple different types of media items.

FIG. 1 is a screen shot of a conventional media management application (MMA) screen 100. The MMA screen 100 includes a source region 102, a track listing region 104, and a series of browse panes 106. A browse control 108 is utilized to present or remove the series of browse panes 106 from the MMA screen 100. In other words, selecting the browse control 108 causes the series of browse panes 106 to be displayed or not displayed in a toggled fashion. As shown in FIG. 1, the browse panes 106 are displayed. In addition, the browse panes 106 shown in FIG. 1 include a genre pane 106-1, an artist pane 106-2 and an album pane 106-3. Still further, the MMA screen 100 includes a search text box 110. The search text box 110 enables a user of the MMA to enter a search text string (e.g., "you") into the search text box 110. After a search string has been entered into the search text box 110, a search control 112 can be selected by the user in order to initiate a search. When a search is initiated, media items within a media source (e.g., Library) are searched for the text string. Those of the media items within the media source that include the text string are then listed in the track listing region 104.

Separate and distinct from searching using the search text box 110, the MMA also facilitates a browse process through media items within the media source using the series of browse panes 106. The particular series of browse panes 106 illustrated in FIG. 1 allow a user of the MMA to select a genre, an artist and an album. As the user makes a selection of an artist from the selectable items in the pane 106-2, the track listing region 104 can display those tracks associated with such artist. Similarly, when the user selects an album from the corresponding selectable items within the pane 106-3, the track listing region 104 can display those corresponding tracks for such album.

Additionally, with respect to search capabilities of the MMA, a user can further limit the fields in which the search operation is performed. As shown in FIG. 2, a drop-down menu control 200 can be utilized to present a drop-down menu 202 on the MMA screen 100. As shown in FIG. 2, the drop-down menu 202 lists a series of fields that can be searched for the text string. As a default, all such fields are searched. However, by selecting a different menu item on the drop-down menu 202, the search process can be limited to searching certain fields. As shown in the drop-down menu 202, the available menu items for selection include: "All", "Artists", "Albums", "Composers" and "Songs".

Although these conventional search and browse capabilities of a media management application are effective for searching or browsing media items of a particular type (e.g., music), when the media management application supports other types of media items, the search operation becomes more difficult. Accordingly, there is a need for improved techniques to facilitate search capabilities of media items, particularly when the media items are of different types of media.

SUMMARY OF THE INVENTION

The invention pertains to techniques and graphical user interfaces that assist users in searching through a group of media items. According to one aspect of the invention, a search assistant (e.g., search bar) can be graphically presented to a user to assist the user in selecting search criteria. In one embodiment, the search assistant can be automatically presented when a search process is being considered by a user. In another embodiment, the search assistant can be context sensitive so as to adapt to different types of media items.

The invention can be implemented in numerous ways, including as a method, system, device, apparatus (including graphical user interface), or computer readable medium. Several embodiments of the invention are discussed below.

As a method for searching through a group of media items, one embodiment of the invention includes at least the acts of: presenting a search text box capable of receiving a text string input; determining whether a text string is present in the search text box; and automatically displaying a search assistant when it is determined that a text string is present in the search text box.

As a graphical user interface, one embodiment of the invention includes at least a media window having a search text box and a search assistant. The search assistant depicts a plurality of categories and a plurality of fields. A user can interact with the search assistant to select one of the categories and one of the fields. In addition, the fields depicted in the search assistant can be dynamically determined based on a user selection of one of the categories.

As a computer readable medium including at least computer program code for searching through a group of media items, one embodiment of the invention includes at least: computer program code for presenting a search box capable of receiving a user input; determining whether a user input is present in the search box; and automatically displaying a search assistant when it is determined that a user input is present in the search box.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to techniques and graphical user interfaces that assist users in searching through a group of media items. According to one aspect of the invention, a search assistant (e.g., search bar) can be graphically presented to a user to assist the user in selecting search criteria. In one embodiment, the search assistant can be automatically presented when a search process is being considered by a user. In another embodiment, the search assistant can be context sensitive so as to adapt to different types of media items.

The invention is well suited for use with a media management application program that operates on a computing device, such as a personal computer. The media management application program can, among other things, maintain groups (e.g., libraries or playlists) of media items, search or browse through media items in such groups, present (e.g., play) media items, etc. The invention is particularly well suited for a media management application program that supports media items of various different types, such as music, images, audiobooks, videos, podcasts, booklets, etc.

Embodiments of the invention are discussed below with reference to FIGS. 3A-11. However, those skilled in the art will readily appreciate that the detailed description given herein with respect to these figures is for explanatory purposes as the invention extends beyond these limited embodiments.

Figure 1:
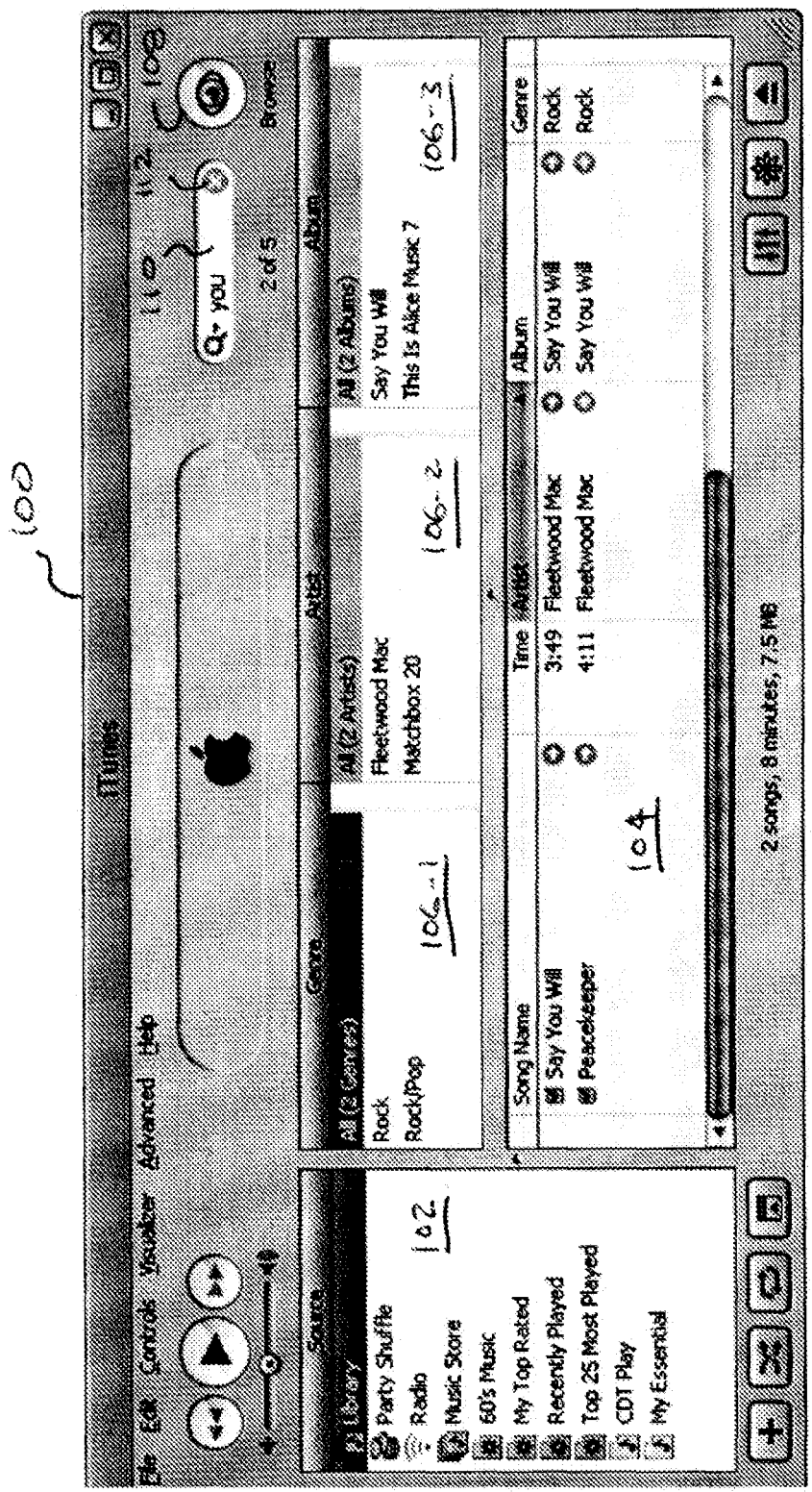
FIGS. 1 and 2 are screen shots of a conventional media management application (MMA) screen.
Figure 2:
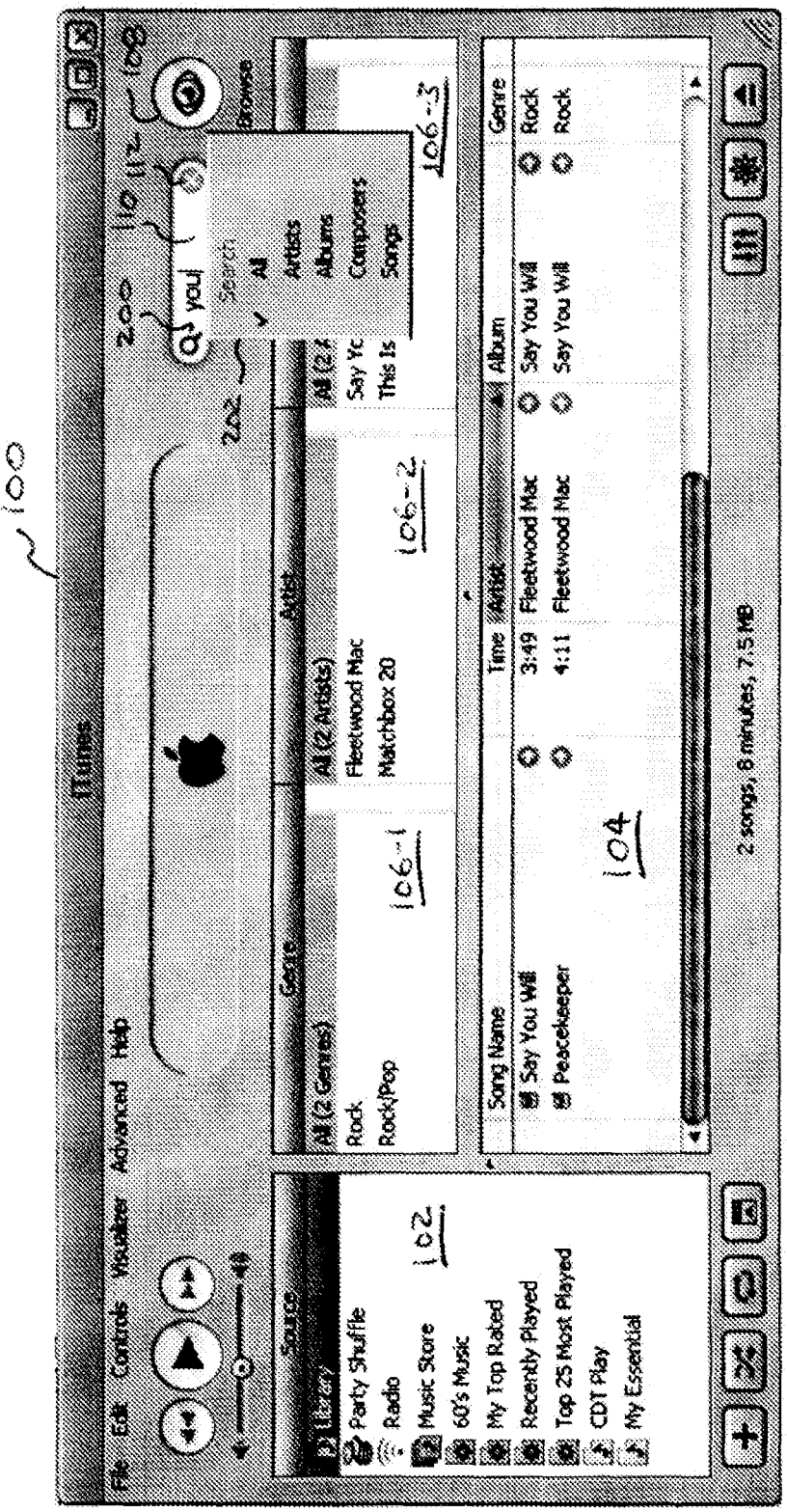
Figure 3A:
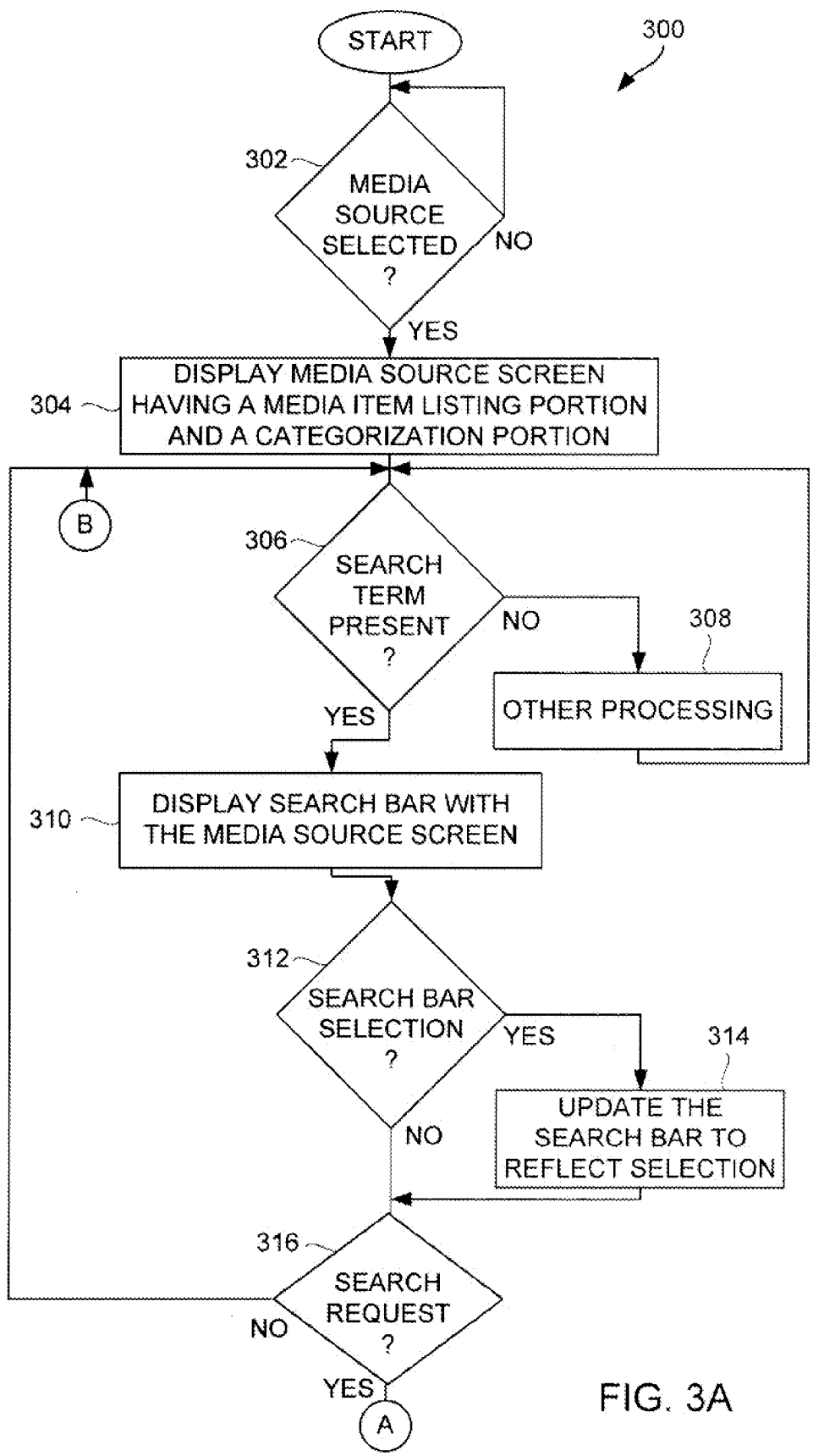
FIGS. 3A and 3B are flow diagrams of a media search process according to one embodiment of the invention.
Figure 3B:
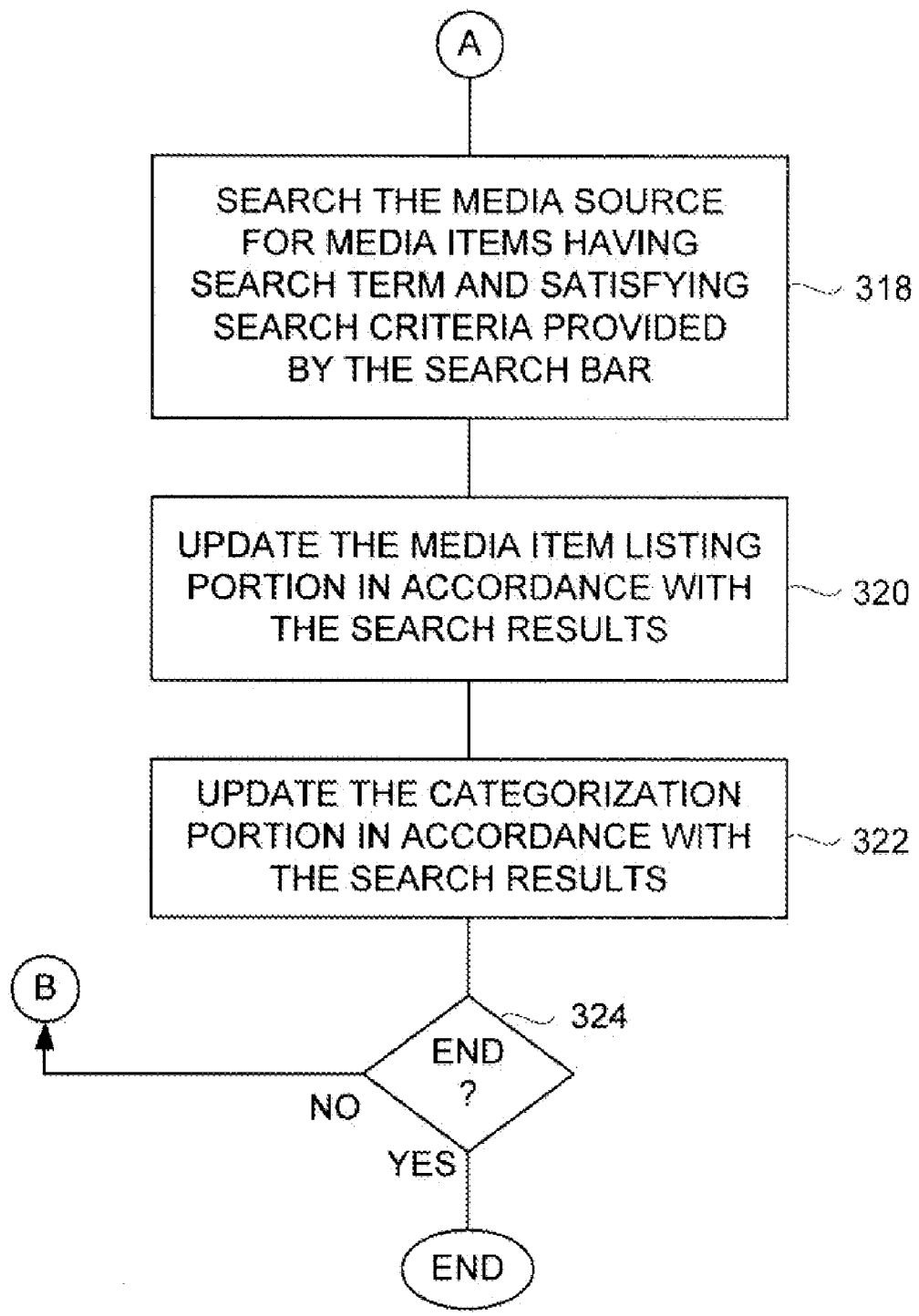

FIGS. 3A and 3B are flow diagrams of a media search process 300 according to one embodiment of the invention. The media search process 300 is, for example, performed by a media management application. Typically, the media management application would operate on a client device, such as a personal computer.

The media search process 300 initially begins with a decision 302 that determines whether a media source has been selected. Here, a media source is generally a group of media items commonly stored. As an example, a media source can pertain to a library of media items, a playlist of media items, and the like. When the decision 302 determines that a media source has not been selected, the media search process 300 awaits such a selection. Since the search process pertains to search of a media source, a media source is needed for the media search process 300 to be performed. Once the decision 302 determines that a media source has been selected, the media search process 300 continues. In other words, the media search process 300 is effectively invoked when a media source has been selected. In any event, after a media source has been selected, a media source screen having a media item listing portion and a categorization portion 304 is displayed.

Next, a decision 306 determines whether a search term is present. Here, the search term can be a text string that has been entered by a user in a text box. In other words, the decision 306 can determine whether the user has entered a search term that is to be utilized in a search process. In effect, the presence of a search term in the text box signals that a search process is being considered by a user. When the decision 306 determines that a search term is not present, then the media search process 300 awaits the presence of a search term. While waiting for the presence of a search term, other processing 308 can be performed by the personal computer.

Once the decision 306 determines that a search term is present, a search bar is displayed 310 with the media source screen. In one implementation, the media source screen previously displayed 304 is modified to further display the search bar. The search bar includes a plurality of selectable graphical user interface elements that enable a user to select media search criteria for use with the search process. After the search bar is displayed 310, a decision 312 determines whether a search bar selection has been made. In one embodiment, the search bar includes a plurality of user-selectable categories and a plurality of user-selectable fields as discussed in more detail below. When the decision 312 determines that a search bar selection has been made, the search bar is updated 314 to reflect the selection. The search bar selections are used to provide search criteria for a search process. Alternatively, when the search bar selection has not been made as well as following the update 314 when a search for selection has been made, a decision 316 determines whether a search request has been received. A search request is typically a user selection of a search control. When the decision 316 determines that a search request has not been received, the media search process 300 returns to repeat the decision 306 and subsequent blocks.

On the other hand, when the decision 316 determines that a search request has been made, the media source is searched 318 for the media items that have the search term and also satisfy search criteria provided by the search bar. Thereafter, the media item listing portion is updated 320 in accordance with the search results. Further, the categorization portion of the of the media source screen can be updated 322 in accordance with the search results. Following the block 322, a decision 324 determines whether the media search process 300 should end. When the decision 324 determines that the media search process 300 should not end, then the media search process 300 returns to repeat the decision 306 and subsequent blocks so that additional search processing can be performed in a like manner. On the other hand, once the decision 324 determines that the media search process 300 should end, the media search process 300 is complete and ends.

Figure 4:
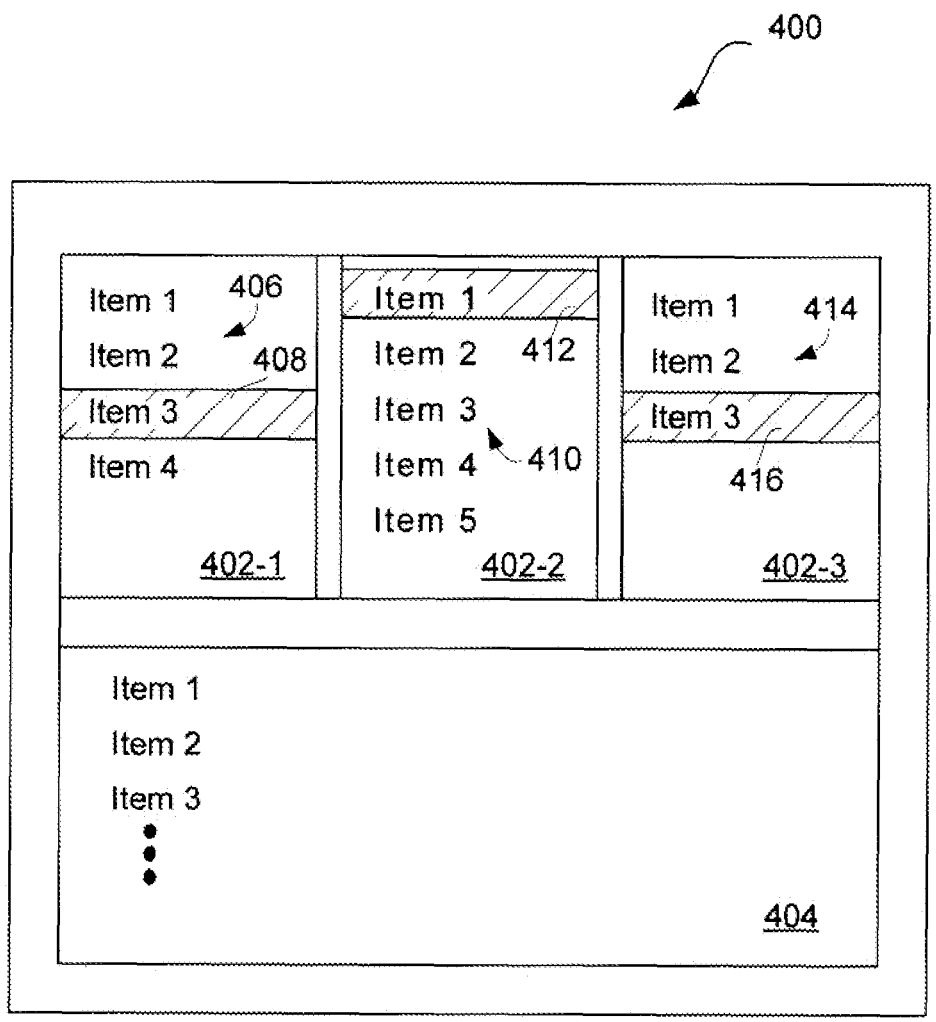
FIG. 4 is a diagram of an application program window according to one embodiment of the invention.

FIG. 4 is a diagram of an application program window 400 according to one embodiment of the invention. The application program window 400 is a graphical user interface for an application program, such as a media management application. A user can interact with the graphical user interface to browse media items that are available to be presented (e.g., played) for a user.

The application program window 400 includes a first sub-window 402 and a second sub-window 404. The first sub-window 402 includes a first region 402-1, a second region 402-2, and a third region 402-3. As an example, with reference to FIGS. 3A and 3B, the application program window 400 can correspond to the media source window, the first sub-window 402 can correspond to the categorization portion of the media source window, and the second sub-window 404 can correspond to the media item listing portion.

As shown in FIG. 4, the first region 402-1 includes a first list 406 of items. A user would interact with the first region 402-1 to select one of the items in the first list 406 of items. The selected item can then be highlighted 408 (or otherwise visually distinguished). Once a particular item within the first list 406 is selected and thus highlighted 408, the media management application identifies the appropriate items for a second list 410 of items that are displayed in the second region 402-2. Again, a user can interact with the second region 402-2 to select one of the items within the second list 410. The selected item can then be highlighted 412 (or otherwise visually distinguished). Then, the selected and highlighted item 412 causes the media management application to identify items that are associated with the selected and highlighted item 412. The identified one or more items that are displayed in a third list 414 within the third region 402-3. A user can interact with the third region 402-3 to select one of the items within the third list 414. The selected item can then be highlighted 416 (or otherwise visually distinguished).

After one of the items within the third list 414 has been selected and highlighted 416, the media management application identifies the one or more items that are associated with the selected and highlighted item 416. The one or more identified items are then displayed in the second sub-window 404. These items can be displayed in a variety of different ways and generally also include descriptive or characteristic information for each of the items. The one or more items can be displayed as a list or as a row and column (e.g., table) format. In one embodiment, the second sub-window 404 is larger than each of the regions of the first sub-window 402, and thus the second sub-window 404 has additional display area for information pertaining to each of the media items being displayed therein. In one embodiment, the items being displayed in the second sub-window 404 are media items. These media items can, for example, be songs, audiobooks, podcasts, videos or images that can be searched, browsed, sorted, played (viewed), previewed and/or purchased.

Figure 5:
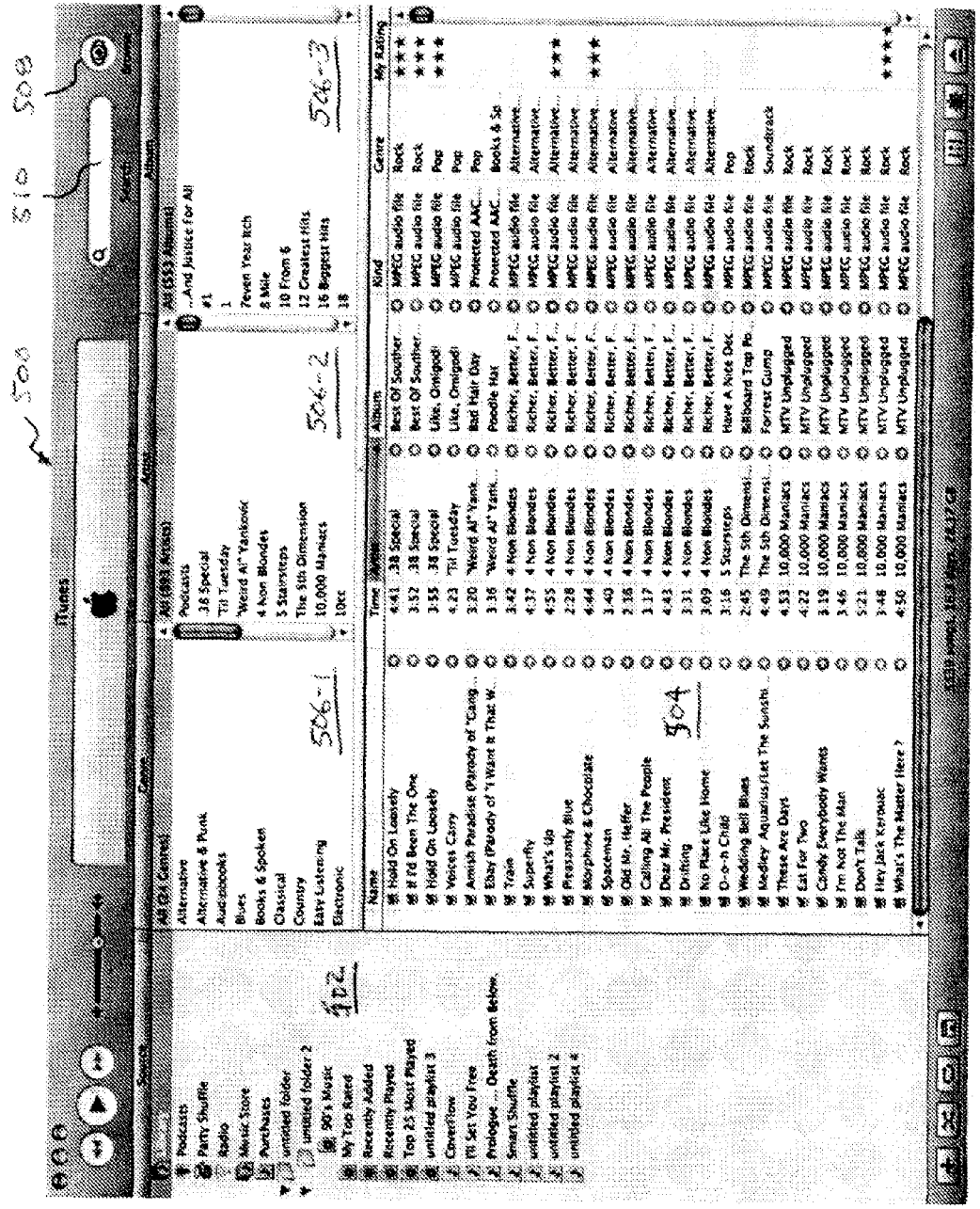
FIGS. 5-7 are exemplary graphical user interfaces (i.e., screens shots) depicting search and browse features according to one representative example of one embodiment of the invention.
Figure 6:
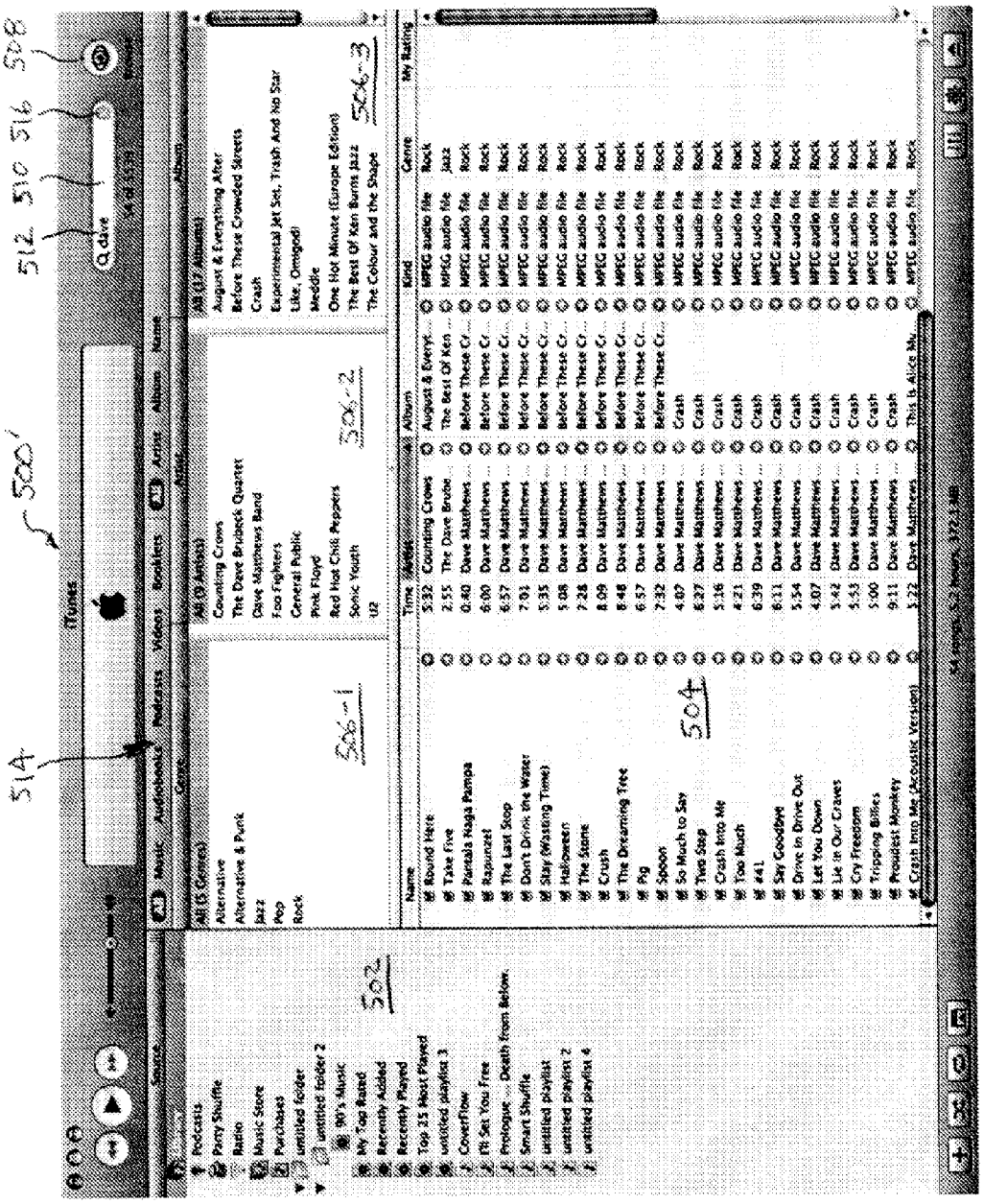
Figure 7:
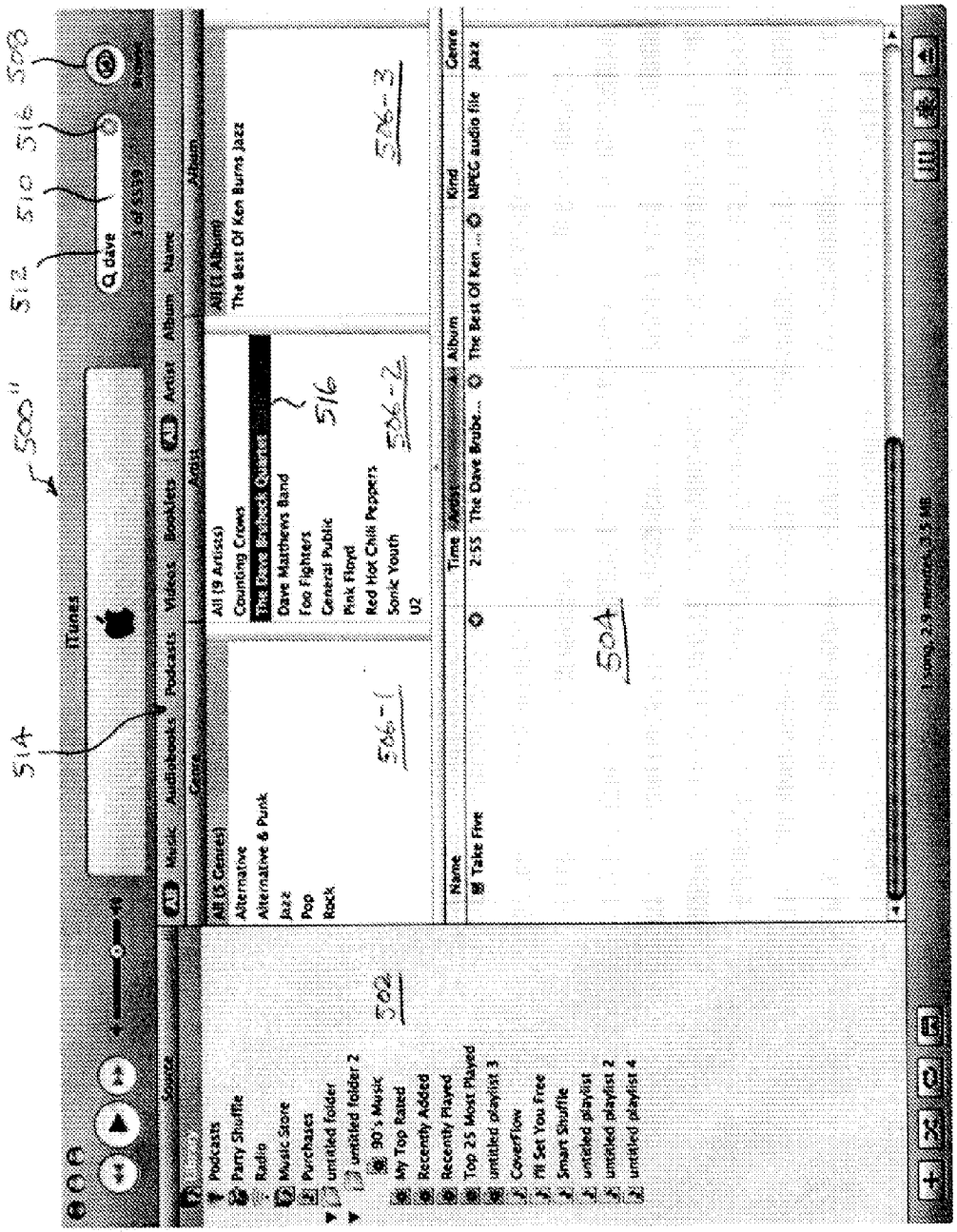

FIGS. 5-7 are exemplary graphical user interfaces (i.e., screens shots) depicting search and browse features according to one representative example of one embodiment of the invention.

FIG. 5 is a screen shot of a media source screen 500 according to one embodiment of the invention. As an example, the media source screen 500 can be produced by an application program, such as a media management application program, operating on a client device, such as a personal computer.

The media source screen 500 includes a source portion (region) 502, a track listing portion (region) 504, and a categorization portion 506. The source portion 502 identifies a source for media items. As shown in FIG. 5, the selected source for media items is a "Library" source. However, other sources for media items are listed in the source portion 502. The track listing portion 504 provides a listing of media items (e.g., audio tracks) associated with the selected source and any browse or search selections. The categorization portion 506 serves to categorize those of the media items listed in the track listing portion 504 and permit selection of one or more categories. In one embodiment, the categorization portion 506 includes a series of panes 506-1, 506-2 and 506-3. These panes 506-1, 506-2 and 506-3 can also be referred to as browse panes. As shown in FIG. 5, the pane 506-1 can be implemented as a genre pane, the pane 506-2 can be implemented as an artist pane, and the pane 506-3 can be implemented as an album pane.

A browse control 508 is utilized to present or remove the categorization portion 506 (e.g., series of browse panes) from the media source screen 500. In other words, selecting the browse control 108 causes the categorization portion 506 to be displayed or not displayed in a toggled fashion. Still further, the media source screen 500 includes a search text box 510. The search text box 510 enables a user of the media source window 500 to enter a search text string into the search text box 510. In FIG. 5, there is no search text string so no search operations are performed with respect to FIG. 5. However, in FIG. 6, the media source screen 500' further includes a search text string 512 that has been entered by a user. Once a search text string 512 is entered into the search text box 510, the media source screen 500' being displayed includes a search bar 514. In one embodiment, once the presence of text is detected in the search text box 510, the search bar 514 can be automatically presented as part of or proximate to the media source screen 500'. Here, the presence of text in the search text box signals that a search is being considered by a user; therefore, the search bar 514 is automatically presented. Although formatted as a bar in FIG. 6, the search bar is more generally a search tool or a search assistant.

A search process can then be performed to determine which of the plurality of media items in the selected source contain the search text string. More particularly, after a search string has been entered into the search text box 510, a search control 516 can be selected by the user in order to initiate a search. When a search is initiated, media items within a media source (e.g., Library) are searched for the text string. Those of the media items within the media source that include the text string are then listed in the media item listing region 504. Note that the media item listing region 504 illustrated in FIG. 6 contains 54 songs that were found to include the text string, whereas the total number of songs in the media source is 5539 songs as illustrated in FIG. 5. Accordingly, by performing a search process using the search string "dave", the number of songs in the media item listing region 504 was substantially narrowed.

Also note that in FIG. 6 following the search process, the selectable items listed in each of the panes 506-1, 506-2 and 506-3 are updates to conform to the results of the search process. At his point, the pane 506-1 includes five (5) different genres, the pane 506-2 includes nine (9) different artists, and the pane 506-3 includes seventeen (17) different albums.

FIG. 7 illustrates a media source screen 500" in which a selection of a user-selectable media item 516 has been made in the pane 506-2. In such case, the selection of the user-selectable media item 516 serves to further browse the media items remaining in the media item listing region 504 (i.e., that satisfy the search string). In this example, the user-selectable media item 516 pertains to the artist "The Dave Brubeck Quartet" and there is one song named "Take Five" that remains in the media item listing region 504. Note that this single song is the only one of the media items in the selected source that satisfies the search string as well as the browse selection(s).

Figure 8:
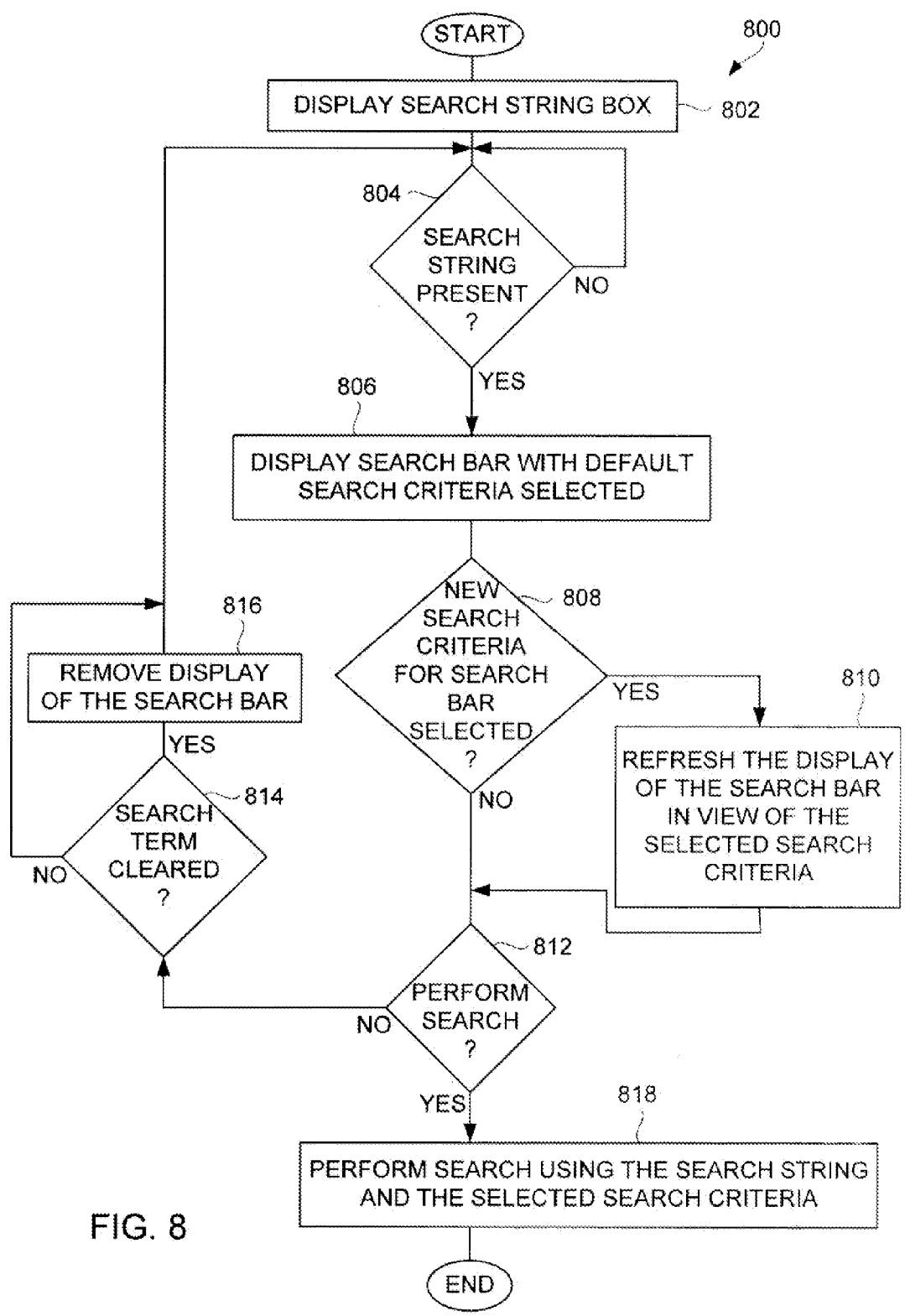
FIG. 8 is a flow diagram of a search process according to one embodiment of the invention.

FIG. 8 is a flow diagram of a search process 800 according to one embodiment of the invention. The search process 800 is, for example, performed by a media management application operating on a computing device, such as a personal computer.

The search process 800 initially displays 802 a search string box. The search string box is a graphical user interface element, such as a text box, that is capable of receiving an input text element or string provided by a user. One example of the search string box is the search text box 510 of the media source screen illustrated in FIG. 5. After the search string box is displayed 802, a decision 804 determines whether a search string has been presented in the search string box. When the decision 804 determines that a search string is not present, the search process 800 awaits such a search string. Here, while waiting for a search string, the media management application can be performing a variety of the other tasks (e.g., in different processing threads or processes).

Nevertheless, once the decision 804 determines that a search string is present, a search bar is displayed 806 with default search criteria selected. Once the search bar is displayed 806, the user can interact with the search bar to alter the search criteria being selected. Hence, a decision 808 determines whether new search criteria for the search bar has been selected. When the decision 808 determines that new search criteria for the search bar has been selected, the displayed search bar is refreshed 810 based on the selected search criteria. Alternatively, when the decision 808 determines that there is no new search criteria for the search bar, or following the block 810 when there is new search criteria, a decision 812 determines whether a search is to be performed. When the decision 812 determines that a search is not to be performed, a decision 814 determines whether the search term from the search string box has been cleared. When the decision 814 determines that the search term has been cleared from the search string box, the display of the search bar is removed 816. Here, when the search string box includes a search string, the search bar is displayed, whereas when there is no search string present in the search string box, the search bar is not displayed. When the decision 814 determines that the search term has not been cleared, then the block 816 is bypassed. Following the block 816, or its being bypassed, the search process 800 returns to repeat the decision 804 and subsequent blocks.

The search bar being displayed is used to assist a user in selecting search criteria for a search process. In one embodiment, the search bar is a contextual search bar in that a portion of the search bar, namely, its items, can dynamically change in view of other user selections at another portion of the search bar so as to provide contextual adjustments.

Figure 9:
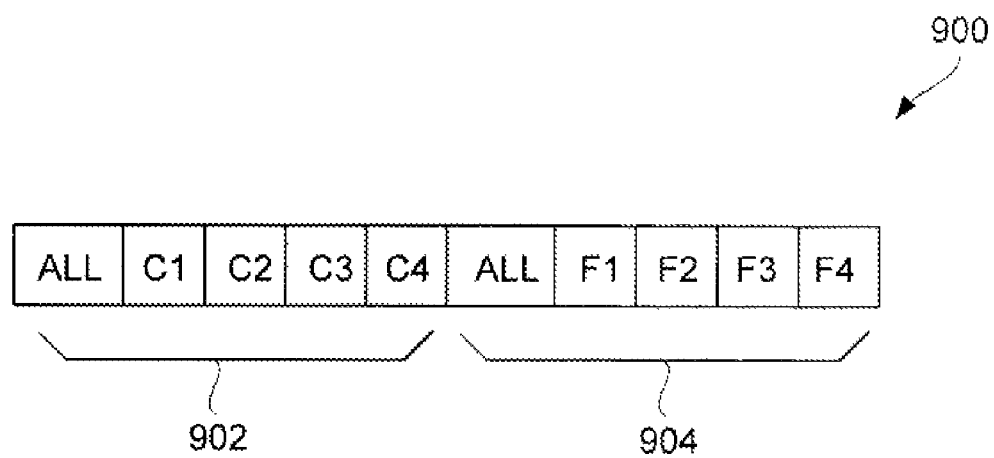
FIG. 9 is a diagram of a representative search bar according to one embodiment of the invention.

FIG. 9 is a diagram of a representative search bar 900 according to one embodiment of the invention. The search bar 900 includes a category section 902 and a fields section 904. The categories section 902 includes a plurality of separately selectable categories, including categories C1, C2, C3 and C4 as well as an "All" category. The fields section 904 includes a plurality of separately selectable fields, including fields F1, F2, F3 and F4 as well as an "All" field. The fields within the fields section 904 can be referred to as contextual fields in that the fields being presented in the fields section 904 are dependent upon the category selection from the category section 902. Given the dynamic contextual nature of the search bar 900, the search bar 900 can also be referred to as a contextual search bar.

FIGS. 10A-10F are representative screen shots of a media management window having a search bar according to one embodiment of the invention. The search bar has a dynamic contextual nature that assists a user in selecting search criteria for a search process.

Figure 10A:
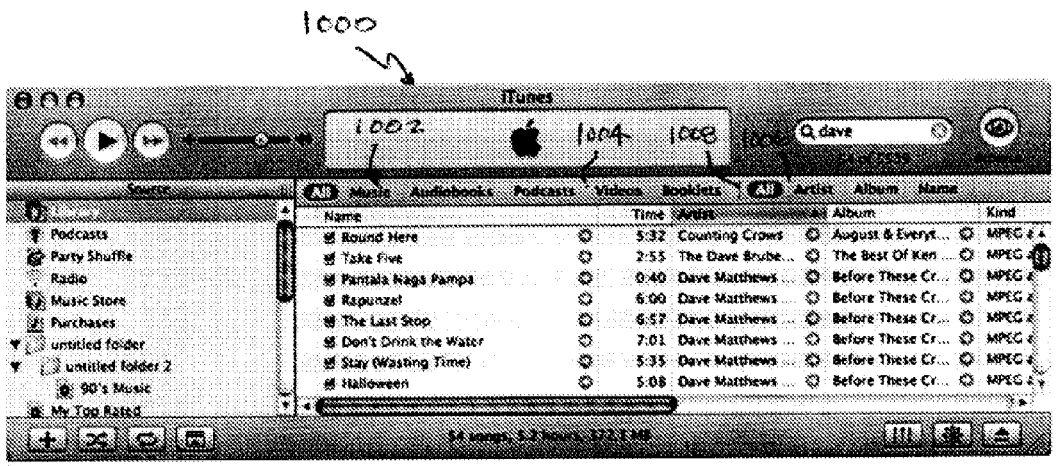
FIGS. 10A-10F are representative screen shots of a media management window having a search bar according to one embodiment of the invention.

FIG. 10A is a screen shot of a media management application window 1000. The media management application window 1000 facilitates a search operation as discussed above. The media management application window 1000 includes a search bar 1002. The search bar 1002 includes a category section 1004 and a fields section 1006. A separator indicator 1008 provides a visual reference indicating a separator for the category section 1004 and the fields section 1006. The category section 1004 includes a number of categories representing different types of media items. In this example, the categories in the categories section 1004 include "All", "Music", "Audiobooks", "Podcasts", "Videos" and "Booklets". The fields section 1006 includes a number of fields. However, as illustrated in FIGS. 10A-10F, the fields within the fields section 1006 are dependent on a selection of a category from the category section 1004. With respect to FIG. 10A, the category "All" is selected and in such case the fields in the fields section 1006 include "All", "Artist", "Album" and "Name". In FIG. 10A, the "All" field is shown selected. Hence, performing a search process with the search bar 1002 selections as shown in FIG. 10A, the search criteria is not further limited since all categories and all fields are used in the search process.

Figure 10B:
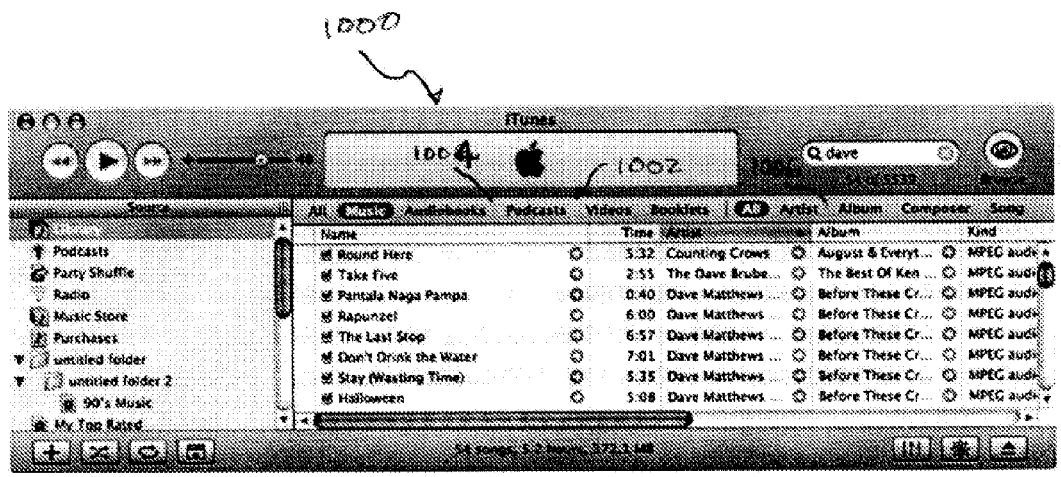

In FIG. 10B, the search bar 1002 depicted in the screen shot of the media management application window 1000 has the "Music" category of the search bar 1002 selected. In this case, the fields in the fields section 1006 include "All", "Artist", "Album", "Composer" and "Song". In FIG. 10B, the "All" field is shown selected. Hence, performing a search process with the search bar 1002 selections as shown in FIG. 10B, the search criteria is limited to only those media items of the "Music" category while using all fields for the search process.

Figure 10C:
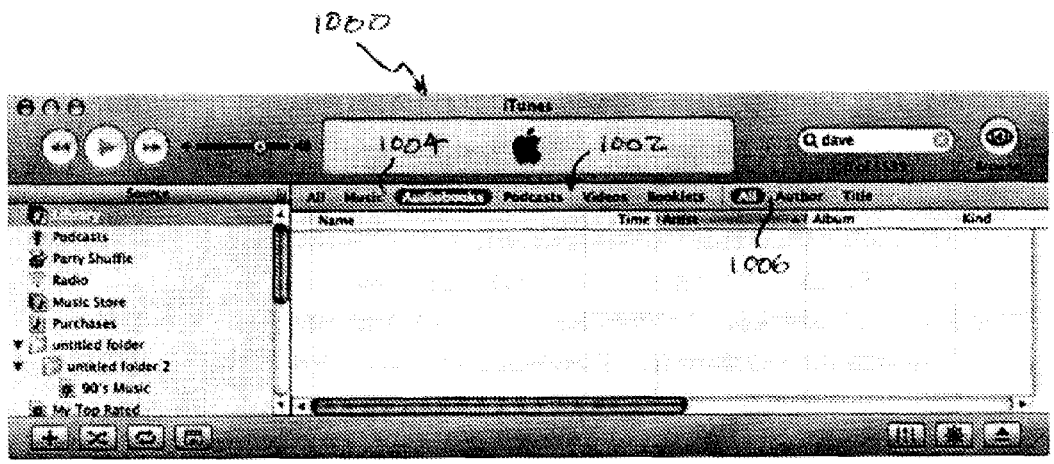

In FIG. 10C, the search bar 1002 depicted in the screen shot of the media management application window 1000 has the "Audiobooks" category of the search bar 1002 selected. In this case, the fields in the fields section 1006 include "All", "Author" and "Title". In FIG. 10C, the "All" field is shown selected. Hence, performing a search process with the search bar 1002 selections as shown in FIG. 10C, the search criteria is limited to only those media items of the "Audiobook" category while using all fields for the search process.

Figure 10D:
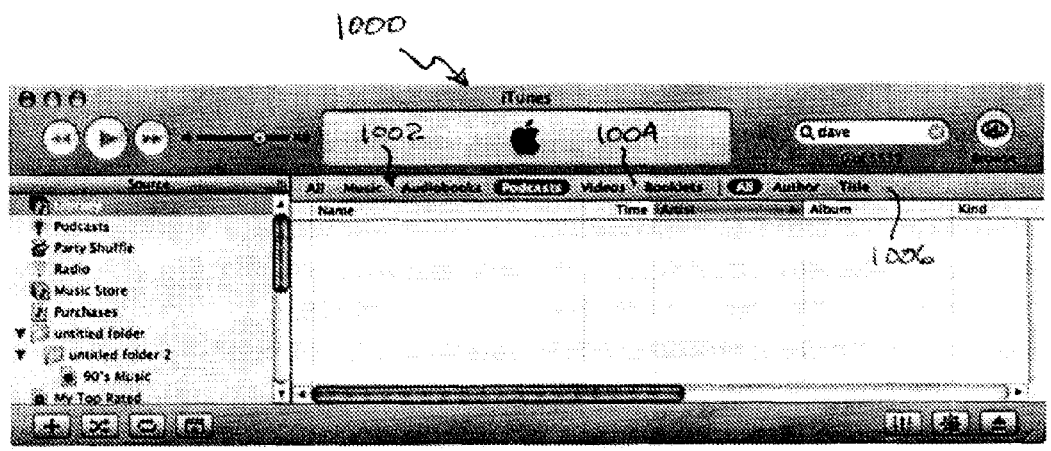

In FIG. 10D, the search bar 1002 depicted in the screen shot of the media management application window 1000 has the "Podcasts" category of the search bar 1002 selected. In this case, the fields in the fields section 1006 include "All", "Author" and "Title". In FIG. 10D, the "All" field is shown selected. Hence, performing a search process with the search bar 1002 selections as shown in FIG. 10D, the search criteria is limited to only those media items of the "Podcast" category while using all fields for the search process.

Figure 10E:
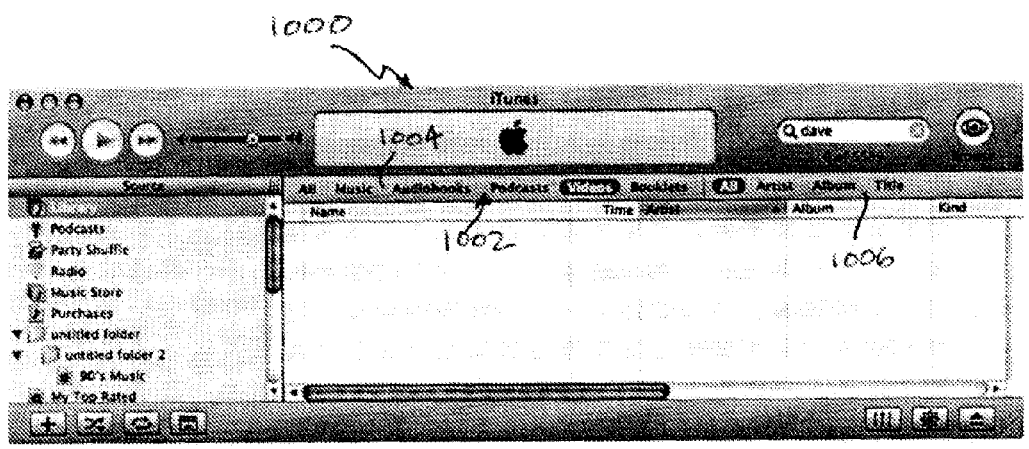

In FIG. 10E, the search bar 1002 depicted in the screen shot of the media management application window 1000 has the "Videos" category of the search bar 1002 selected. In this case, the fields in the fields section 1006 include "All", "Artist", "Album" and "Title". In FIG. 10E, the "All" field is shown selected. Hence, performing a search process with the search bar 1002 selections as shown in FIG. 10E, the search criteria is limited to only those media items of the "Video" category while using all fields for the search process.

Figure 10F:
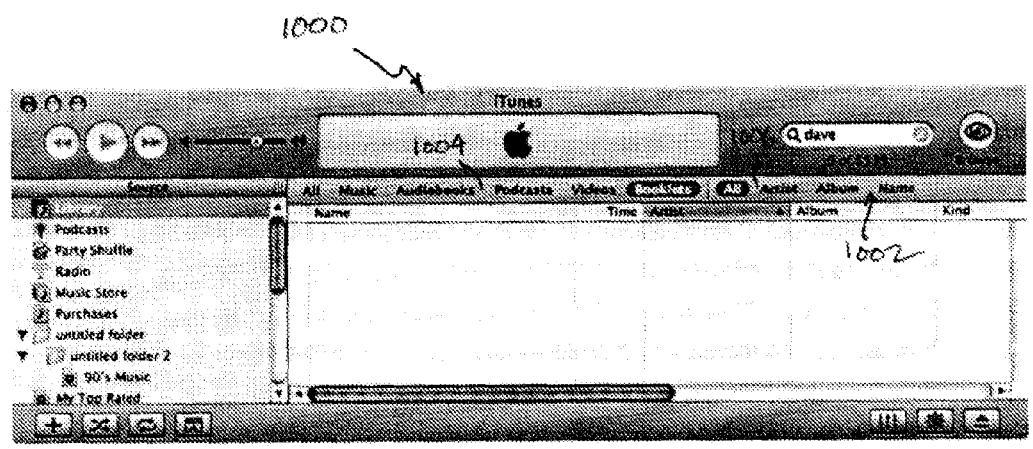

In FIG. 10F, the search bar 1002 depicted in the screen shot of the media management application window 1000 has the "Booklets" category of the search bar 1002 selected. In this case, the fields in the fields section 1006 include "All", "Artist", "Album" and "Name". In FIG. 10E, the "All" field is shown selected. Hence, performing a search process with the search bar 1002 selections as shown in FIG. 10F, the search criteria is limited to only those media items of the "Booklet" category while using all fields for the search process.

Selection of a particular category and/or field of the search bar serves to provide search criteria that limits the search process to only those media items that satisfy the search criteria. The search bar can also exhibit a context sensitive characteristic whereby fields being presented in the fields section of the search bar are dependent on a category selected in a category section. As a new category is selected, the fields presented in the fields section can automatically be determined and presented. As a result, fields present in the fields section are context sensitive to a category selection for the category section.

Figure 11:
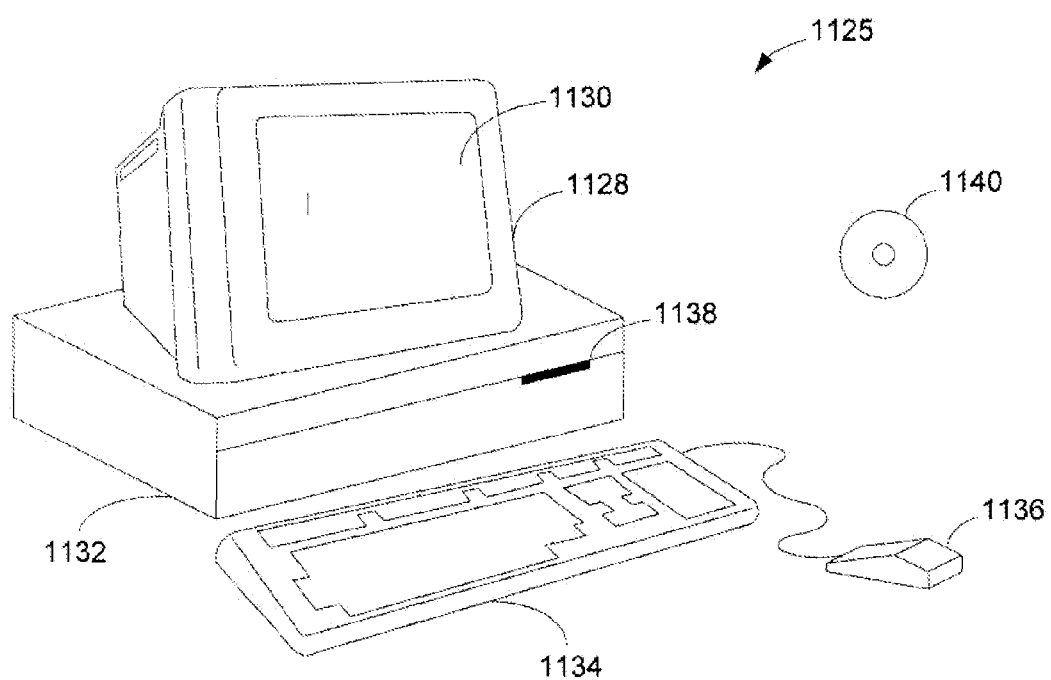
FIG. 11 shows an exemplary computer system suitable for use with the invention.

FIG. 11 shows an exemplary computer system 1125 suitable for use with the invention. Computer system 1125 includes a display monitor 1128 having a single or multi-screen display 1130 (or multiple displays), cabinet 1132, keyboard 1134, and mouse 1136. Cabinet 1132 houses a drive 1138, such as a CD-ROM or floppy drive, system memory and a hard drive (not shown) which may be utilized to store and retrieve software programs incorporating computer code that implements the present invention, data for use with the invention, and the like. Although CD-ROM 1140 is shown as an exemplary computer readable storage medium, other computer readable storage media including floppy disk, tape, flash memory, system memory, and hard drive may be utilized. In one implementation, an operating system for the computer system 1125 is provided in the system memory, the hard drive, the CD-ROM 1140 or other computer readable storage medium and serves to incorporate the computer code that implements the invention.

The various aspects, embodiments, implementations or features of the invention can be used separately or in any combination.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that a search process is able to be facilitated in a robust, user-friendly manner. Another advantage of the invention is that searching through different types of media (e.g., music, videos, audiobooks, podcasts or booklets) is facilitated. Still another advantage of the invention is that a search assistant (e.g., a search bar) can be dynamically presented to assist a user in selecting search criteria.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for searching through a group of media items, said method being performed by a computing device having a display associated therewith, said method comprising:
    presenting, on the display, a search text box capable of receiving a text string input;
    determining whether a text string is present in the search text box; and
    automatically displaying, on the display, a search assistant when it is determined that a text string is present in the search text box,
    wherein the search assistant facilitates selection of search criteria for use when searching for the text string within the group of media items, and wherein the searching is confined to the search criteria selected using the search assistant,
    wherein the search assistant includes a category section having a plurality of predetermined categories, and a fields section having a plurality of predetermined fields, and
    wherein the plurality of predetermined categories and the plurality of predetermined fields are simultaneously displayed in a row prior to performing a search in accordance with the text string,
    wherein the predetermined categories of the search assistant depicted in the row pertain to at least a music category and a video category,
    when the music category is selected, the one or more fields being dynamically determined and depicted in the row include at least one of artist, album, composer and song, and
    when the video category is selected, the one or more fields being dynamically determined and depicted in the row include at least one of artist, album and title.

2. A method as recited in claim 1, wherein the search assistant is presented as or in a search bar.

3. A method as recited in claim 1, wherein the fields presented in the search assistant are dynamically determined and are different depending on a selection of one of the categories.

4. A graphical user interface produced by a computing device and presented on a display associated with the computing device, comprising:
    a media window presented on the display, said media window having a search text box and a search assistant,
    wherein said search assistant depicts a plurality of categories and a plurality of fields,
    wherein said search assistant horizontally and simultaneously depicts the categories and the fields in a horizontal row,
    wherein a user can interact with said search assistant to select one of the categories and one of the fields,
    wherein the fields depicted in said search assistant are dynamically determined based on a user selection of one of the categories,
    wherein the different categories horizontally depicted in the search assistant pertain to at least a music category and a video category,
    when the music category is selected, the one or more fields being dynamically determined and horizontally depicted include at least one of artist, album, composer and song, and
    when the video category is selected, the one or more fields being dynamically determined and horizontally depicted include at least one of artist, album and title.

5. A computer readable medium including at least computer program code stored thereon for searching through a group of media items, said computer readable medium comprising:

computer program code for presenting a search box capable of receiving a user input;

computer program code for determining whether a user input is present in the search box; and computer program code for automatically displaying a search assistant when it is determined that a user input is present in the search box, wherein the search assistant facilitates selection of search criteria for use when searching for the text string within the group of media items, and wherein the searching is confined to the search criteria selected using the search assistant, wherein the search assistant includes a category section having a plurality of predetermined categories, and a fields section having a plurality of predetermined fields, and wherein the plurality of predetermined categories and the plurality of predetermined fields are simultaneously displayed in a horizontal row prior to performing a search in accordance with the text string, wherein the predetermined categories horizontally depicted in the search assistant pertain to at least a music category and a video category, when the music category is selected, the one or more fields being horizontally depicted include at least one of artist, album, composer and song, and when the video category is selected, the one or more fields being horizontally depicted include at least one of artist, album and title.

6. A computer readable medium as recited in claim 5, wherein the search assistant is presented as or in a search bar.

7. A computer readable medium as recited in claim 5, wherein the fields presented in the search assistant are dynamically determined and are different depending on a selection of one of the categories.

8. A computer readable medium as recited in claim 7, wherein one of the predetermined categories in the search bar is an "All" category that is inclusive of all the different categories.

9. A computer readable medium as recited in claim 7, wherein the different predetermined categories in the search assistant pertain to at least: music, podcasts and videos.

10. A computer readable medium as recited in claim 5, wherein an additional one of the predetermined categories in the search assistant is an "All" category that is inclusive of all the different categories.

11. A computer readable medium as recited in claim 7, wherein the different predetermined categories in the search assistant further includes at least one of: an audiobooks category and a podcasts category.

12. A computer readable medium as recited in claim 11, wherein an additional one of the predetermined categories in the search assistant is an "All" category that is inclusive of all the different categories.

13. A computer readable medium as recited in claim 5, wherein the search assistant is a horizontal search bar, and wherein the horizontal search bar includes the category section having the plurality of categories horizontally arranged, and the fields section having the plurality of fields horizontally arranged.

14. A graphical user interface as recited in claim 4, when the music category is selected, the fields being dynamically determined and horizontally depicted include at least artist, album, composer and song, and when the video category is selected, the fields being dynamically determined and horizontally depicted include at least artist, album and title.

15. A graphical user interface as recited in claim 4, wherein the different categories horizontally depicted in the search assistant further includes a podcast category, and when the podcasts category is selected, the fields being dynamically determined and horizontally depicted include at least one of author and title.

16. A graphical user interface as recited in claim 4, wherein the different categories horizontally depicted in the search assistant further includes, a podcast category and an audiobooks category, when the podcasts category is selected, the fields being dynamically determined and horizontally depicted include at least one of author and title, and when the audiobooks category is selected, the fields being dynamically determined and horizontally depicted include at least one of author and title.

\* \* \* \* \*

UNITED STATES PATENT AND TRADEMARK OFFICE
CERTIFICATE OF CORRECTION

| | | |
|---|---|---|
| PATENT NO. | : 7,788,582 B2 | Page 1 of 1 |
| APPLICATION NO. | : 11/221385 | |
| DATED | : August 31, 2010 | |
| INVENTOR(S) | : Jeffrey L. Robbin et al. | |

It is certified that error appears in the above-identified patent and that said Letters Patent is hereby corrected as shown below:

In column 12, line 36, in claim 16, delete "includes," and insert -- includes --, therefor.

Signed and Sealed this
Twenty-ninth Day of November, 2011

David J. Kappos
*Director of the United States Patent and Trademark Office*